(12) United States Patent
Verbridge (10) Patent No.: US 12,055,954 B2
(45) Date of Patent: Aug. 6, 2024

(54) PRESSURE EQUALIZATION STRUCTURE FOR VEHICLE COMPONENTS

(71) Applicant: Rivian IP Holdings, LLC, Plymouth, MI (US)

(72) Inventor: Mason Verbridge, Canton, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 967 days.

(21) Appl. No.: 16/934,617

(22) Filed: Jul. 21, 2020

(65) Prior Publication Data
US 2022/0026936 A1 Jan. 27, 2022

(51) Int. Cl.
G05D 16/04 (2006.01)
B60R 16/08 (2006.01)
F16H 57/027 (2012.01)
H01M 50/30 (2021.01)

(52) U.S. Cl.
CPC .......... G05D 16/04 (2013.01); B60R 16/08 (2013.01); F16H 57/027 (2013.01); H01M 50/394 (2021.01); H01M 2220/20 (2013.01)

(58) Field of Classification Search
CPC .... F16H 57/027; G05D 16/04; H01M 50/394; H01M 2220/20; B60R 16/08
USPC .................................................... 138/26, 30
See application file for complete search history.

(56) References Cited

U.S. PATENT DOCUMENTS

| | | | | |
|---|---|---|---|---|
| 2,405,614 A * | 8/1946 | Shriro | ....................... | E04B 1/62 220/721 |
| 3,146,724 A * | 9/1964 | Cornelsen | ............... | F16L 55/04 417/539 |
| 4,032,265 A * | 6/1977 | Miller | ................. | F04B 11/0016 137/565.34 |
| 4,195,668 A * | 4/1980 | Lewis | ................... | F16L 55/053 220/721 |
| 5,724,864 A * | 3/1998 | Rodgers | .............. | F16H 57/0483 74/606 R |
| 5,981,099 A * | 11/1999 | Bourbeau | ........... | H01M 50/394 429/82 |
| 8,592,063 B1 * | 11/2013 | Musetti | ............... | H01M 50/308 137/511 |
| 2003/0127240 A1 | 7/2003 | Beckbissinger et al. | | |
| 2004/0173051 A1 * | 9/2004 | Sinka | .................... | F16H 57/027 74/607 |

(Continued)

FOREIGN PATENT DOCUMENTS

CN 103188904 A 7/2013
CN 103493240 A 1/2014
(Continued)

*Primary Examiner* — David R Deal
(74) *Attorney, Agent, or Firm* — Haley Guiliano LLP (57) ABSTRACT

A pressure equalization structure is provided. The pressure equalization structure includes a vehicle component comprising an internal cavity having a first volume, and a first passageway coupled to the internal cavity, and an equalization structure for equalizing air pressure in the internal cavity with ambient pressure. The equalization structure includes a first end coupled to the first passageway, a second end exposed to the ambient pressure, and a second passageway between the first end and the second end, the second passageway having a second volume. The equalization structure has an installed orientation in which the first end is arranged above the second end.

20 Claims, 9 Drawing Sheets

(56) References Cited

U.S. PATENT DOCUMENTS

| | | | |
|---|---|---|---|
| 2016/0201837 A1* | 7/2016 | Hartmann | F16L 55/041 138/30 |
| 2019/0226574 A1* | 7/2019 | Basham | F16H 57/04 |
| 2020/0067294 A1 | 2/2020 | Oda et al. | |

FOREIGN PATENT DOCUMENTS

| | | |
|---|---|---|
| CN | 109955702 A | 7/2019 |
| CN | 210519267 U | 5/2020 |
| DE | 10241507 A1 | 3/2004 |
| GB | 191323552 A | 1/1914 |
| JP | 2005-055243 A | 3/2005 |

* cited by examiner

PRESSURE EQUALIZATION STRUCTURE FOR VEHICLE COMPONENTS

SUMMARY

Vehicle components exposed to the outside environment (e.g., electric engine assemblies, gearboxes, battery modules, etc.) may be designed to withstand a wide range of conditions, such as a wide range of temperatures due to environmental conditions and/or heat generated by the vehicle components themselves. If the internal volume of a vehicle component is held constant across a wide range in temperatures, air pressure within the internal volume may vary significantly, exerting significant pressure on any sealing components. Accordingly, it is advantageous to vent vehicle components to allow the air pressure in the internal volume to be equalized with ambient pressure.

In some embodiments, it is advantageous to provide venting solutions which allow vehicle components to be submerged in water (e.g., when the vehicle is traveling through deep water), without requiring any vehicle-specific components or snorkel assemblies which extend above the waterline to allow submerged vehicle components to vent air and equalize with ambient pressures.

The present disclosure advantageously provides an equalization structure which allows submerged vehicle components to equalize to ambient pressure, without extending above the waterline or requiring complicated vehicle specific assemblies. To accomplish this, a pressure equalization structure is provided. The pressure equalization structure includes a vehicle component including an internal cavity having a first volume, and a first passageway coupled to the internal cavity, and an equalization structure for equalizing air pressure in the internal cavity with ambient pressure. The equalization structure includes a first end coupled to the first passageway, a second end exposed to the ambient pressure, and a second passageway between the first end and the second end, the second passageway having a second volume. The equalization structure has an installed orientation in which the first end is arranged above the second end.

In some embodiments of the present disclosure, the second volume may be greater than an expected volume of air required to equalize the air pressure in the internal cavity with the ambient pressure when a temperature of the air in the internal cavity is cooled from a first temperature corresponding to a maximum expected operating temperature of the vehicle component to a second temperature corresponding to a minimum expected operating temperature of the vehicle component as a result of the vehicle component being at least partially submerged in water at the second temperature.

In some embodiments of the present disclosure, a ratio of the second volume to the first volume may be at least 0.39.

In some embodiments of the present disclosure, the vehicle component may be a combined motor, bus bar, and inverter assembly.

In some embodiments of the present disclosure, the vehicle component may be a gearbox.

In some embodiments of the present disclosure, the vehicle component may be a battery module.

In some embodiments of the present disclosure, the pressure equalization structure may further include an input seal including a semipermeable membrane. The input seal may be disposed in the first passageway of the first component and separates the internal cavity from the second passageway.

In some embodiments of the present disclosure, the pressure equalization structure may further include an input seal including a semipermeable membrane. The input seal may be disposed in the second passageway at the first end of the equalization structure and separates the internal cavity from a portion of the second passageway from the input seal to the second end.

In some embodiments of the present disclosure, the equalization structure may include a cylindrically shaped middle section between a first end section including the first end and a cylindrically shaped second end section including the second end, and the equalization structure may be connected to an exterior surface of the vehicle component.

In some embodiments of the present disclosure, a diameter of the cylindrically shaped middle section may be larger than a diameter of the cylindrically shaped second end section.

In some embodiments of the present disclosure, the equalization structure may include a rectangular cross-section.

In some embodiments of the present disclosure, the equalization structure may include a circular cross-section.

In some embodiments of the present disclosure, the equalization structure may be attached to an outer surface of the vehicle component.

In some embodiments of the present disclosure, the internal cavity may include a first internal cavity housing a first component and a second internal cavity housing a second component, and the first internal cavity and the second internal cavity may be coupled to each other by a third passageway.

In some embodiments of the present disclosure, the first component may be a motor and the second component may be a gearbox.

In some embodiments of the present disclosure, the pressure equalization structure may further include an input seal including a semipermeable membrane. The input seal may be disposed in the third passageway and separates the first internal cavity from the second internal cavity.

In some embodiments of the present disclosure, the equalization structure and the vehicle component may be separate components mechanically coupled together.

In some embodiments of the present disclosure, the equalization structure and the vehicle component may be integrally formed as a single component.

In some embodiments of the present disclosure a pressure equalization structure includes a vehicle component including a first internal cavity having a first volume, a first passageway coupled to the first internal cavity, a second internal cavity having a second volume, and a second passageway coupled to the second internal cavity. The first internal cavity is separate from the second internal cavity. The pressure equalization structure further includes a first equalization structure for equalizing air pressure in the first internal cavity with ambient pressure, the first equalization structure including a first end coupled to the first passageway, a second end exposed to the ambient pressure, and a third passageway between the first end and the second end, the third passageway having a third volume. The first equalization structure has an installed orientation in which the first end is arranged above the second end. The pressure equalization structure further includes a second equalization structure for equalizing air pressure in the second internal cavity with the ambient pressure, the second equalization structure including a third end coupled to the second passageway, a fourth end exposed to the ambient pressure, and a fourth passageway between the third end and the fourth end, the fourth passageway having a fourth volume. The second equalization structure has an installed orientation in which the third end is arranged above the fourth end.

In some embodiments of the present disclosure, the vehicle component may be a combined motor, bus bar, inverter, and gearbox assembly, the first internal cavity may house the motor, the bus bar, and the inverter, and the second internal cavity may house the gearbox.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

In view of the foregoing, and in accordance with some embodiments of the present disclosure, it would be advantageous to provide an equalization structure that allows a vehicle component to quickly equalize internal air pressure to ambient pressure, even when a hot vehicle component is submerged in cold water, without allowing the water to enter the vehicle component or requiring vehicle specific snorkel structure that extends above the waterline. For example, when a hot vehicle component is submerged in cold water, air pressure in the vehicle component drops due to the drop in temperature caused by the submersion of the vehicle component in cold water. In this case, it is necessary to add air to the internal volume of the vehicle component to equalize the air pressure to ambient pressure. To do this, the pressure equalization structure described herein may use an equalization structure having a first end coupled to a passageway into an internal cavity of the vehicle component, and a second end exposed to ambient pressure. By providing the equalization structure with an installed orientation in which the first end is arranged above the second end, and providing sufficient volume within a passageway between the first end and the second end, air trapped in the equalization structure may equalize the air pressure in the internal cavity of the vehicle component, without allowing any water to reach the passageway into the internal cavity of the vehicle component.

Figure 1:
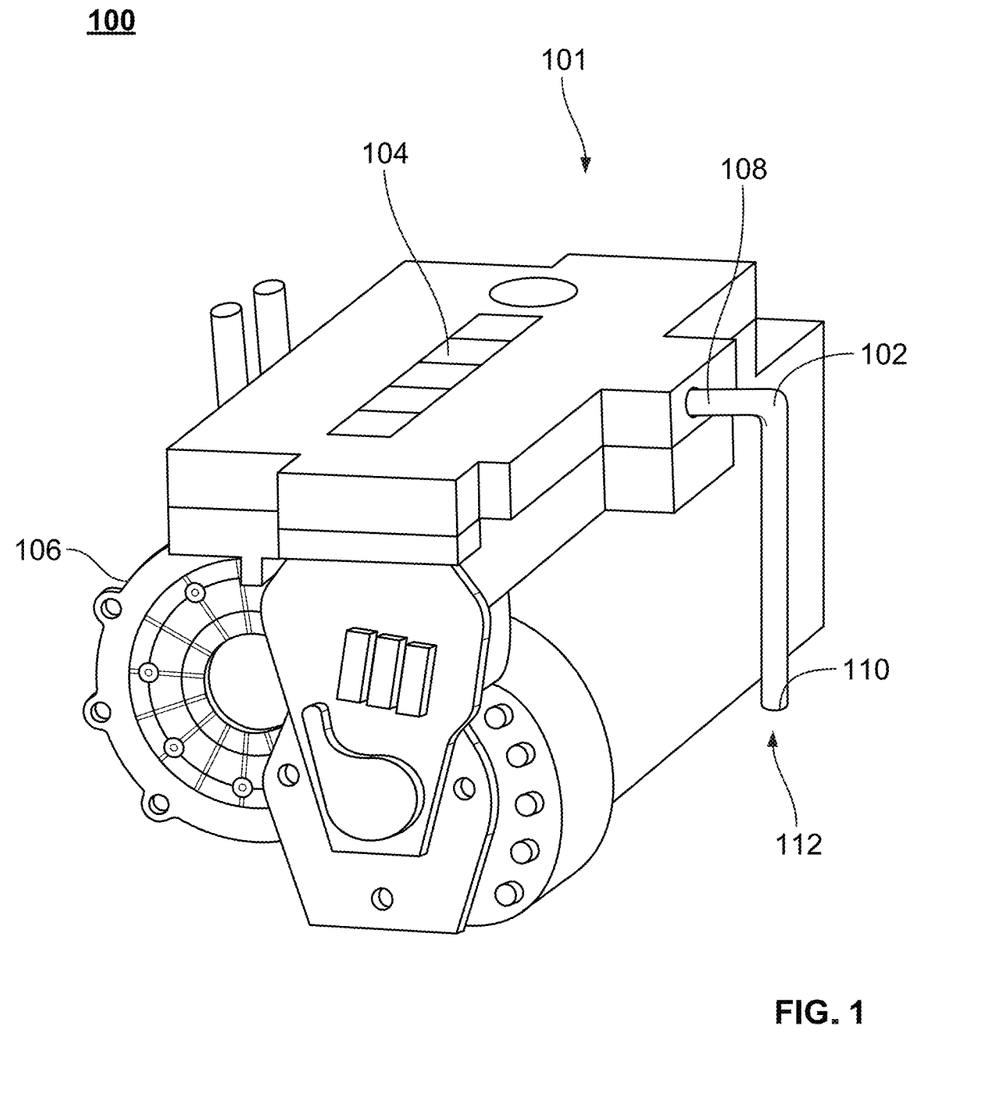
FIG. 1 shows a view of a pressure equalization structure, in accordance with some embodiments of the present disclosure.

FIG. 1 shows a view of a pressure equalization structure 100, in accordance with some embodiments of the present disclosure. As shown, the pressure equalization structure may include a vehicle component 101 and an equalization structure 102. In some embodiments, the vehicle component may be a motor assembly for an electric vehicle. As shown, the vehicle component 101 may include a first housing structure 104 and a second housing structure 106. In some embodiments, the first housing structure 104 houses an electric motor, a bus bar, and an inverter. In some embodiments, the first housing structure 104 houses multiple electric motors, multiple bus bars, and multiple inverters. In some embodiments, the first housing structure 104 includes sub-housings for each of the electric motor(s), bus bar(s), and inverter(s). In some embodiments, the second housing structure 106 houses one or more gearboxes. Although two separate housing structures are referred to herein, it should be understood that each of the components of the vehicle component 101 may be housed in a single housing, multiple housings, or combined housings. In some embodiments, separate housings or sub-housings may be internally vented to each other so as to equalize air pressure within the separate housings or sub-housings of the vehicle component 101, as shown in greater detail in FIG. 10. In some embodiments, it may be advantageous to not vent separate housings or sub-housings to each other (e.g., in some arrangements, venting a gearbox to an inverter may cause oil droplets to enter the inverter when internal pressure equalizes between the components).

In some embodiments, the first housing structure 104 may have a first internal volume and the second housing structure 106 may have a second internal volume. As described herein, the internal volume of a housing (or vehicle component) refers to the amount of the housing that is filled with air (i.e., the volume of air in the housing) when the components are installed in the housing. The maximum temperature of air in the first housing structure 104 and the second housing structure 106 may correspond to the maximum operating temperature of the components installed in the respective housings. For example, in some embodiments, Table 1 below shows the internal volumes and operating temperatures of the first housing structure 104 and the second housing structure 106, when the first housing structure 104 houses a motor/bus bar/inverter assembly and the second housing structure 106 houses a gearbox.

TABLE 1

| Device Internal Volumes and Operating Temperatures | |
|---|---|
| Gearbox Internal Air Volume (Total) | 10.00 liters |
| Inverter Internal Air Volume (Per Core, Per Side) | 4.80 liters |
| Inverter Internal Air Volume (Per Lid, Per Side) | 2.50 liters |
| Motor Internal Air Volume (Per Side) | 1.47 liters |
| Bus Bar Area Internal Air Volume (Per Side) | 1.12 liters |
| Combined Motor/Bus Bar/Inverter Assembly Infernal Air Volume (Total) | 19.78 liters |
| Max Inverter Temp (Constant Power) | 80° C. |
| Max Gearbox Temp (Constant Power) | 90° C. |
| Max Motor Temp (Constant Power) | 160° C. |
| Max Bus Bar Area Temp (Constant Power) | 160° C. |

As shown above in Table 1, the first housing structure 104 may include a plurality of sub-housings for each of the installed components. In some embodiments, each of these sub-housings are internally vented to each other. In some embodiments, the first housing structure 104 and the second housing structure 106 are internally vented to each other.

As shown in FIG. 1, the equalization structure 102 is mounted on an exterior surface of the first housing structure 104. The equalization structure 102 may include a first end 108 coupled to the first housing structure 104 and a second end 110 exposed to the outside (ambient pressure). The equalization structure 102 may include a passageway 112 extending between the first end 108 and the second end 110. That is, the equalization structure 102 may be hollow with open ends at the first end 108 and the second end 110. The equalization structure 102 has an installed orientation in which the first end 108 is arranged above the second end 110, as shown in greater detail in FIG. 9. In some embodiments, it is advantageous to mount the equalization structure 102 as high as possible on the first housing structure 104 with respect to an installed orientation of the vehicle component 101.

Figure 2:
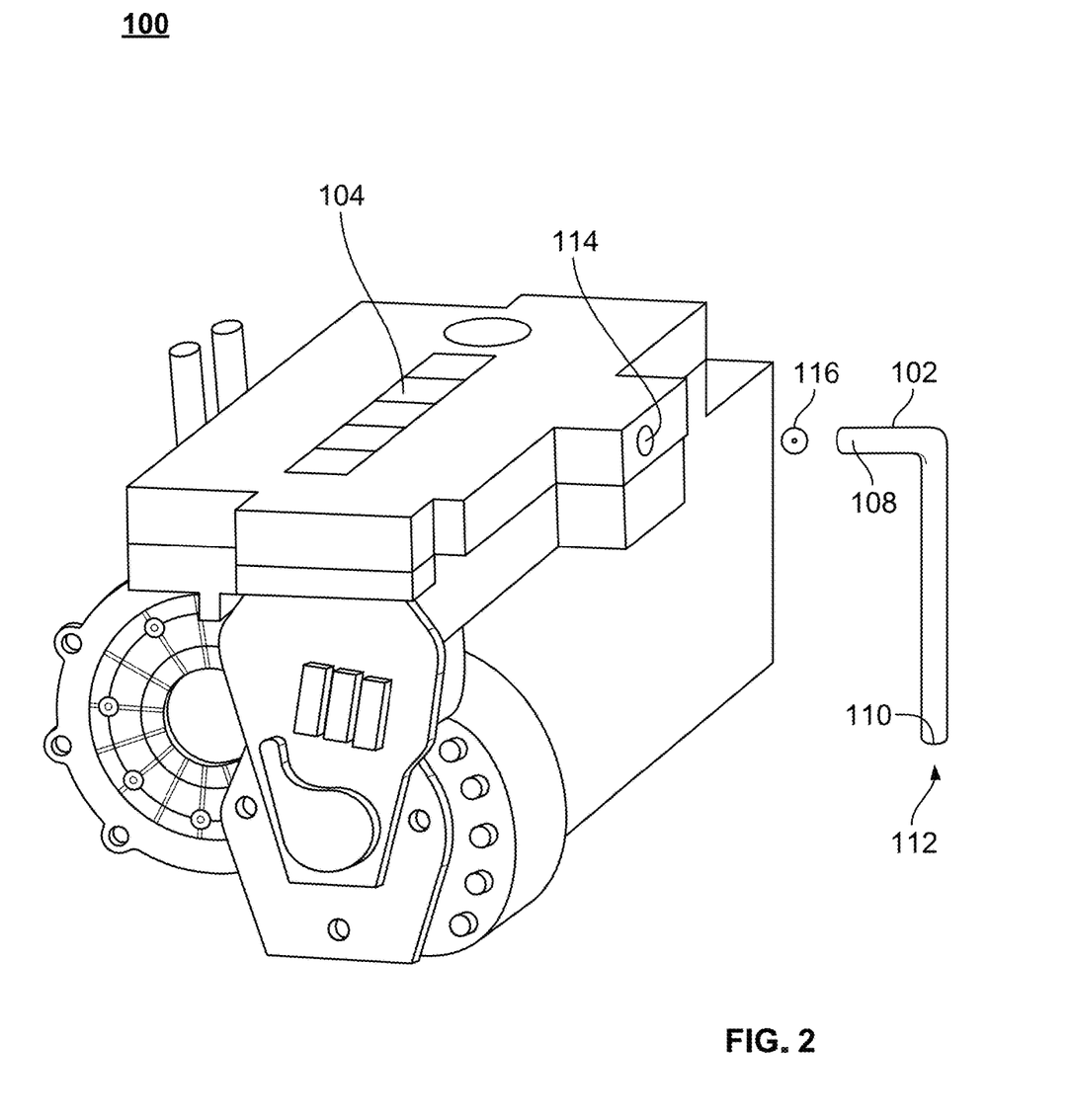
FIG. 2 shows an exploded view of the pressure equalization structure of FIG. 1, in accordance with some embodiments of the present disclosure.

FIG. 2 shows an exploded view of the pressure equalization structure 100 of FIG. 1, in accordance with some embodiments of the present disclosure. As shown, the first housing structure 104 may include a passageway 114 that is coupled to the internal cavity of the first housing structure 104. That is, the passageway 114 may be a through-hole in the first housing structure 104 (e.g., a vent hole). The first end 108 of the equalization structure 102 may be coupled to the first housing structure 104 at the passageway 114 so that the passageway 112 and the passageway 114 combine to form a passageway from the internal cavity of the first housing structure 104 through the second end 110, thereby allowing the air pressure of the internal cavity of the first housing to be equalized with ambient pressure.

In some embodiments of the present disclosure, the passageway 114 may include an input seal 116 (e.g., a vent seal) that separates the internal cavity of the first housing structure 104 from the passageway 112 of the equalization structure 102. The input seal 116 may be a membrane that allows air to pass through, but that is resistant to liquid water below a certain pressure (e.g., 7 pounds per square inch (PSI)). Thus, even if the component is submerged in water and liquid water reaches passageway 114, the input seal 116 will prevent liquid water from entering the internal volume of the first housing structure 104. Although the input seal 116 is shown as being disposed in the passageway 114, the input seal 116 may also be disposed in the passageway 114 at the first end 108 of the equalization structure 102.

Figure 3A:
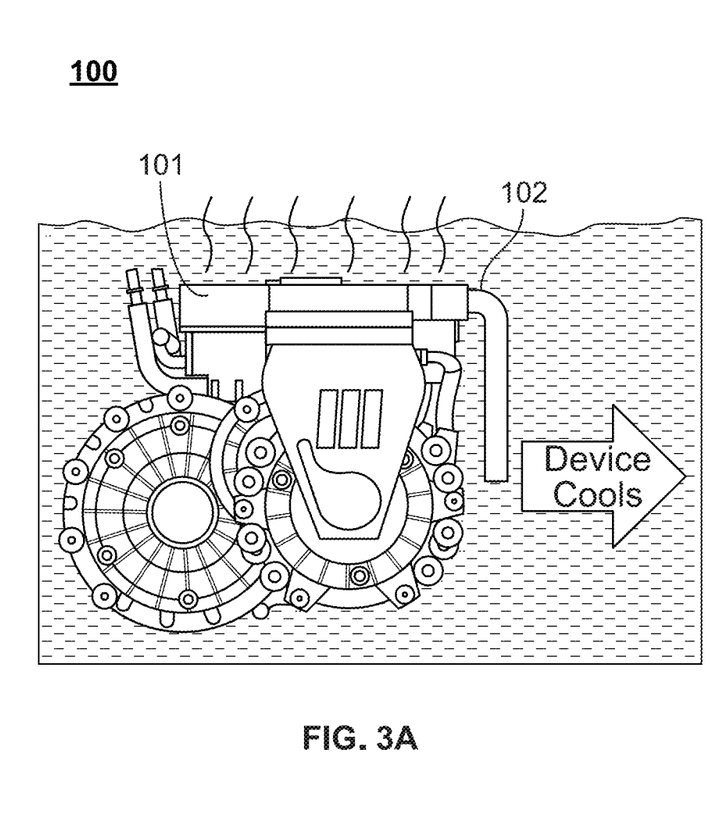
FIGS. 3A and 3B show an example of a pressure equalization structure being submerged in water, in accordance with some embodiments of the present disclosure.
Figure 3B:
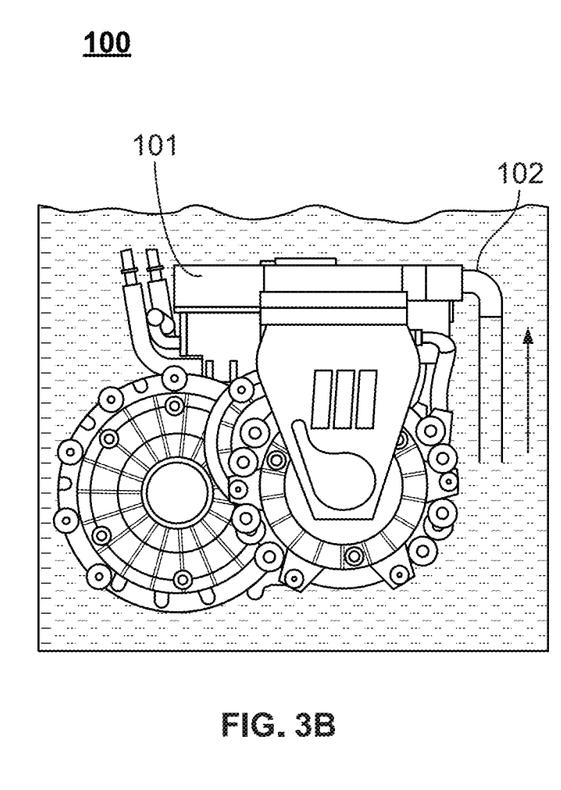

FIGS. 3A and 3B show an example of the pressure equalization structure 100 being submerged in water, in accordance with some embodiments of the present disclosure. When the vehicle component 101 is submerged in water during operation, the temperature of the vehicle component 101 and the air inside of the vehicle component 101 (i.e., in the internal cavity of the first housing structure 104 and in the internal cavity of the second housing structure 106) cools rapidly, resulting in a corresponding drop in air pressure. As air is an ideal gas, this drop in air pressure can be generally modeled by the ideal gas law (PV=nRT, where P, V, and T are the pressure, volume, and temperature, n is the amount of the substance, and R is the ideal gas constant). Thus, compensate for this drop in pressure and equalize the pressure in the internal cavity of the first housing structure 104 and the internal cavity of the second housing structure 106 with ambient pressure, air must be added. Depending on ambient air temperature and the heat radiated from the vehicle component 101, air inside the passageway 114 of the equalization structure 102 may also cool rapidly when submerged in water.

As shown in FIG. 3A, when the pressure equalization structure 100 is first submerged in water and the temperature of the air inside of the vehicle component 101 (and in the equalization structure 102) has not dropped, only a small amount of water will enter the passageway 114 of the equalization structure 102 due to hydrostatic pressure to equalize air pressure to ambient pressure.

As shown in FIG. 3B, after the pressure equalization structure 100 has been submerged in water for a period of time sufficient to cool the air inside of the vehicle component 101 (and the equalization structure 102), air trapped inside of the equalization structure 102 is drawn into the vehicle component 101 to equalize the air pressure with ambient pressure.

In some embodiments, it may be advantageous to design the equalization structure 102 with a sufficient internal volume (i.e., the internal volume of the passageway 114) to compensate for the most extreme conditions that the pressure equalization structure 100 may be expected to be exposed to, so that water never reaches the first end 108 of the equalization structure 102. Thus, in the example below, it is assumed that the temperatures of air inside of the vehicle component 101 drops from the maximum operating temperatures specified above in Table 1, to 0° C. when the vehicle component 101 is submerged in seawater at 0° C. for an extended period of time. In this case, the amount of air that must be added to equalize air pressure corresponds to the change in temperature as well as the hydrostatic pressure that is dependent on the depth of submersion and may also be modeled by the ideal gas law. An example of ambient conditions for this calculation is shown below in Table 2.

TABLE 2

| Ambient Conditions | |
|---|---|
| Ambient Atmospheric Pressure | 14.7 PSI |
| Density Of Seawater | 1030 kg/m$^3$ |
| Ideal Gas Constant | 8.314 J/mol*K |
| Ambient Water Temperature | 0° C. |
| Submersion Depth | 1.0 m |
| Absolute Pressure At Depth Due To Water And Atmosphere | 16.2 PSI |
| Hydrostatic Pressure At Submerged Depth | 1.5 PSI |

Accordingly, based on the ideal gas law, it will be necessary to add approximately 5.22 liters of air (at atmospheric pressure) to the internal cavity of the first housing structure 104 (see Table 3 below), and 2.48 liters of air (at atmospheric pressure) to the internal cavity of the second housing structure 106 (see Table 4 below).

TABLE 3

| Combined Motor/Bus Bar/Inverter | |
|---|---|
| Internal Air Volume (Total) | 19.78 liters |
| Volume Of Ambient Air Required To Equalize Pressure To Ambient Pressure | 5.22 liters |

TABLE 4

| Gearbox | |
| --- | --- |
| Internal Air Volume (Total) | 10.00 liters |
| Volume Of Ambient Air Required To Equalize Pressure To Ambient Pressure | 2.48 liters |

Thus, in the above example, as shown in FIG. 3B, in order to ensure that water will not reach the input seal 116 in the passageway 114, the volume of the passageway 112 of the equalization structure 102 should be greater than approximately 7.70 liters. Of course, this is only one example, and the volume of the equalization structure 102 may be adapted for a specific application, e.g., based on the expected maximum and minimum temperatures.

In some embodiments, as described above, the input seal 116 may be resistant to liquid water below a certain pressure. Thus, in some cases, it may be advantageous to design the equalization structure 102 with a volume smaller than 7.70 liters for space-saving purposes. For example, the equalization structure 102 may be designed with a volume that prevents water from reaching the vent seal in most cases. In some embodiments, the vent seal may be resistant to liquid water even when the vehicle component 101 is fully submerged. In this case, the equalization structure 102 may still be provided.

In some embodiments, depending on the design and application of the equalization structure 102, the volume may be made larger than the minimum calculated volume. For example, when the equalization structure 102 is used for a vehicle component and the vehicle is on a slope, the effective volume of the equalization structure 102 may be smaller. Thus, extra volume (e.g., in addition to the minimum calculated volume) may be added to the equalization structure 102 to compensate for this condition.

Figure 4:
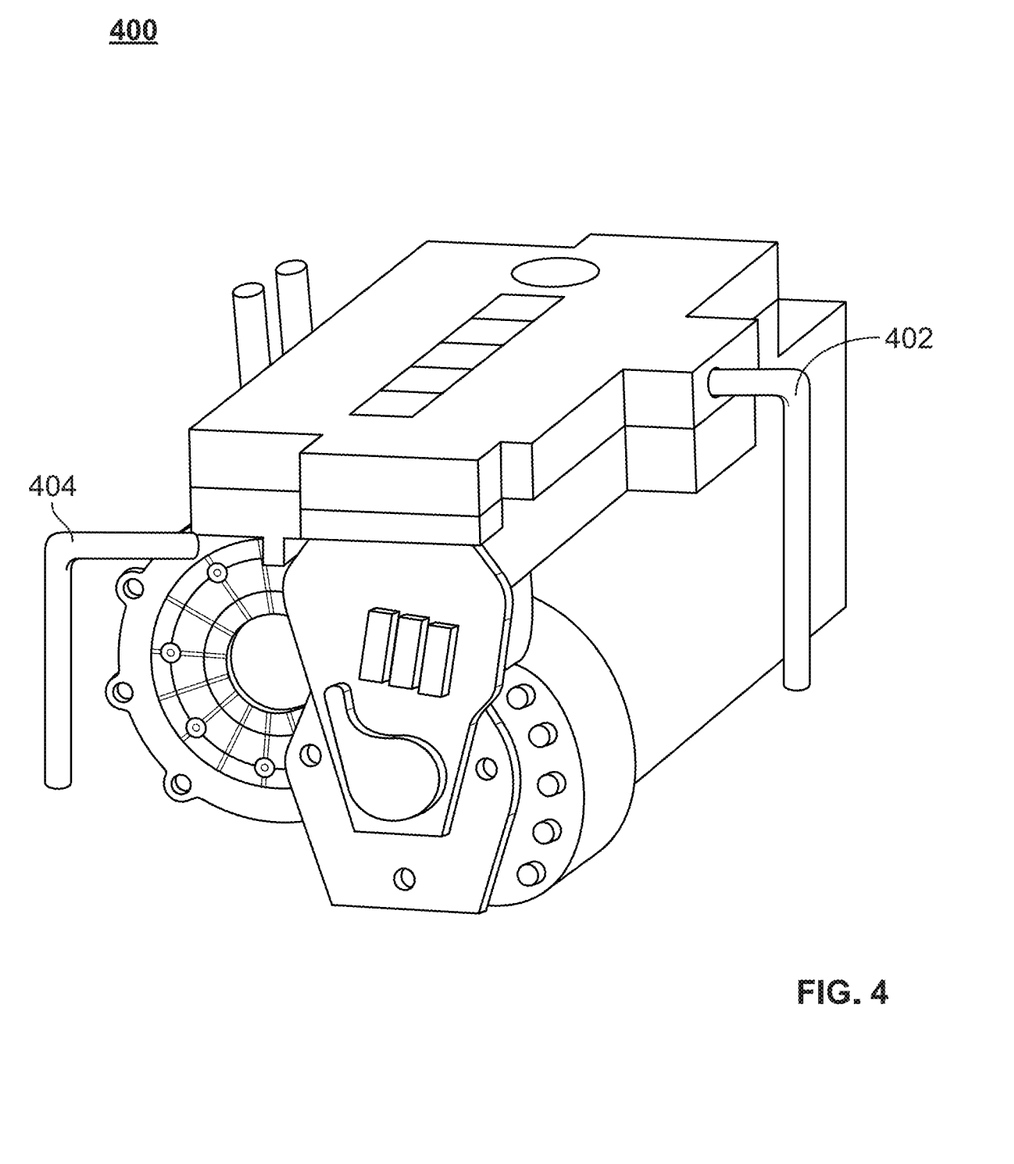
FIG. 4 shows a view of a pressure equalization structure, in accordance with some embodiments of the present disclosure.
Figure 5A:
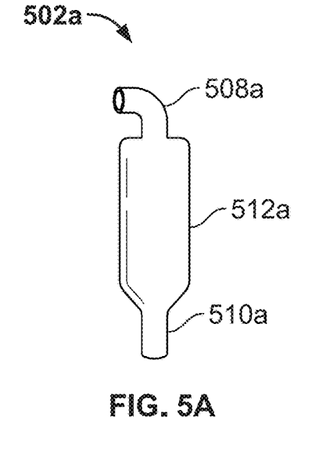
FIGS. 5A-5F show views of equalization structures, in accordance with some embodiments of the present disclosure.
Figure 5B:
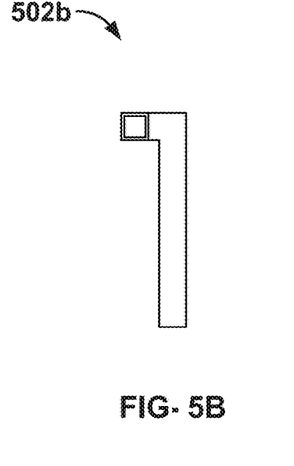
Figure 5C:
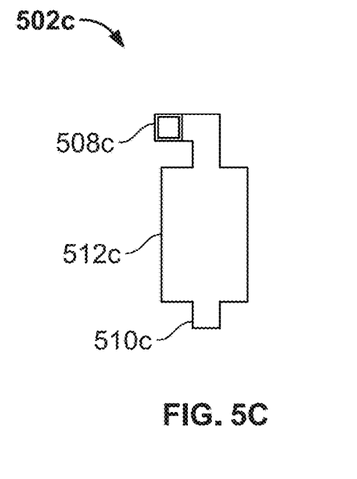
Figure 5D:
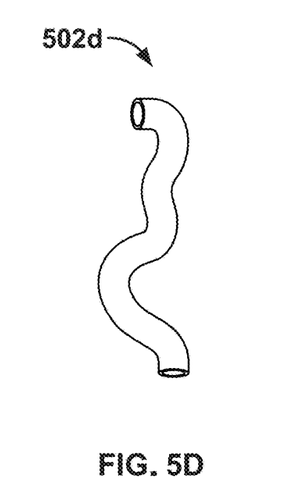
Figure 5E:
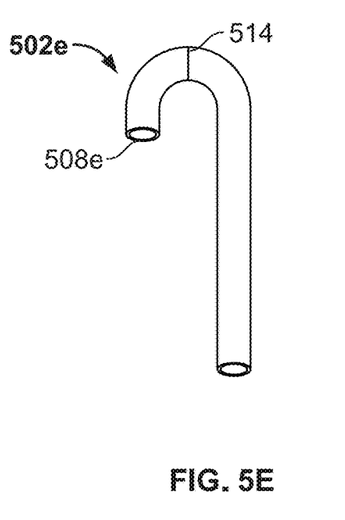
Figure 5F:
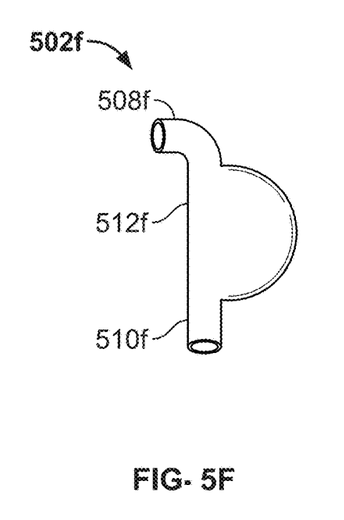

In some embodiments of the present disclosure, a separate equalization structure may be used for each of the first housing structure 104 and the second housing structure 106, as shown in FIG. 4.

FIG. 4 shows a view of a pressure equalization structure 400, in accordance with some embodiments of the present disclosure. The pressure equalization structure 400 is similar to the pressure equalization structure 100 in FIG. 1, except that the pressure equalization structure 400 may additionally include a second equalization structure 404 (e.g., in addition to the first equalization structure 402). Thus, based on the example above, the volume of the first equalization structure 402 is at least 5.22 liters, and the volume of the second equalization structure 404 is 2.48 liters.

FIGS. 5A-5F show views of different equalization structures, in accordance with some embodiments of the present disclosure. As shown, an equalization structure may comprise any suitable shape that corresponds to the requirements associated with a pressure equalization structure. It will be understood that the shapes of the equalization structures may have different advantages, and the particular shape chosen for a particular application may be selected based on a variety of factors. As shown, equalization structure 502a of FIG. 5A has a narrow cylindrical shape at a first end 508a and at a second end 510a, and a wide cylindrical shape at a middle section 512a. Equalization structure 502b of FIG. 5B has a rectangular cross-section. However, this is only one example, and the equalization structure 502b may have any cross-section. For example, the equalization structure 502b may have a circular cross-section, as shown in, e.g., FIG. 1. Equalization structure 502c of FIG. 5C may be similar to the equalization structure 502a, but with a rectangular cross-section. For example, the equalization structure 502c may have a narrow first end 508c, a narrow second end 510c, and a wide middle section 512c. Equalization structure 502d of FIG. 5D has a cylindrical cross-section. However, the profile of the equalization structure 502d may correspond to the outer surface of the vehicle component it is to be mounted to. Equalization structure 502e of FIG. 5E has a "candy-cane" shape with a cylindrical cross-section. The equalization structure 502e may be used for vehicle components that have a low profile (e.g., a battery module) to provide a taller passageway (e.g., to store a greater amount of air for equalization). In some embodiments, first end 508e may be coupled to a top surface of a vehicle component. In some embodiments, a vent seal 514 may be provided in equalization structure 502e at the highest point in an installed orientation. Equalization structure 502f of FIG. 5F may have a narrow cylindrical shape at a first end 508f and at a second end 510f, and a hemisphere shape at a middle section 512f.

Figure 6:
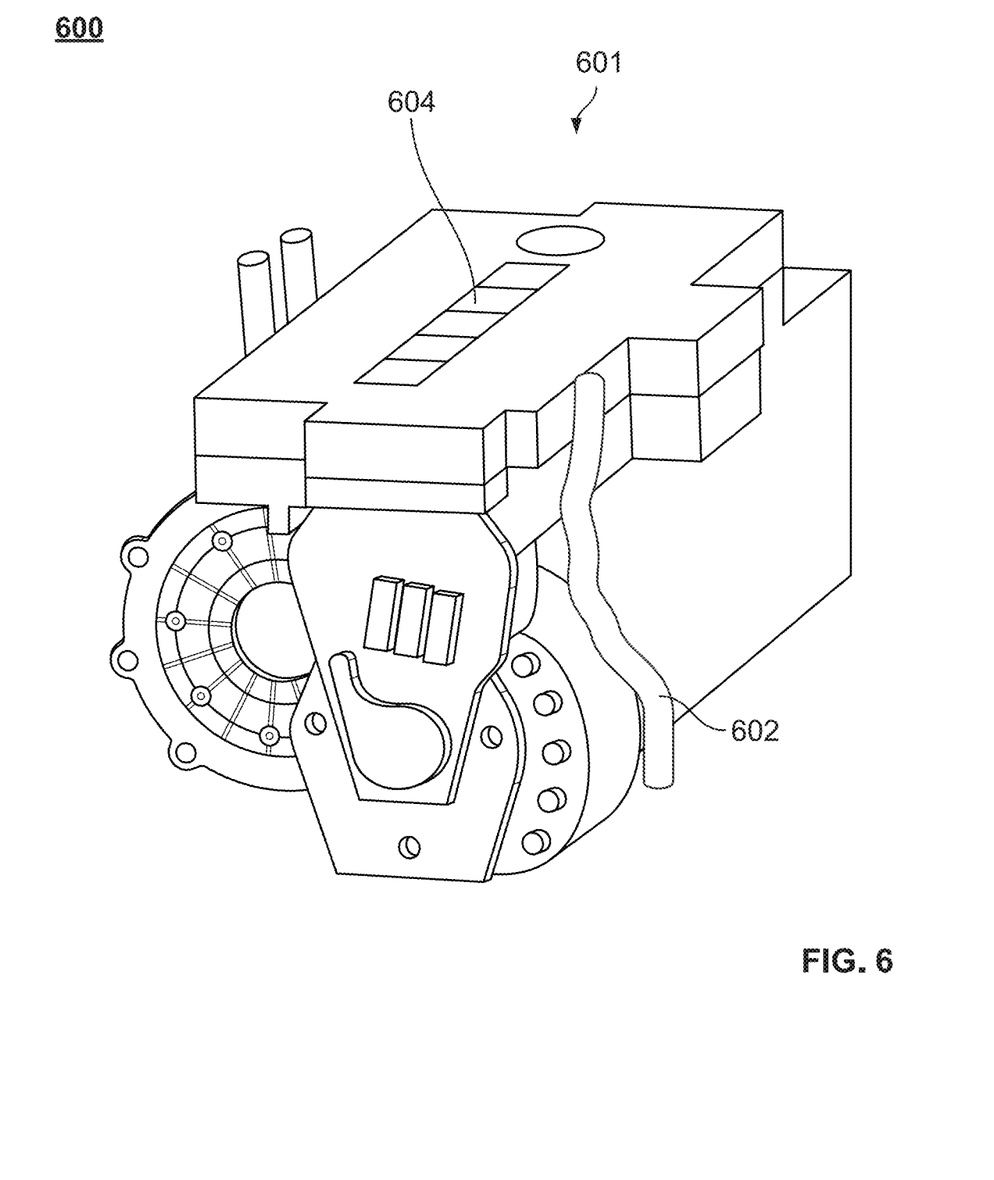
FIG. 6 shows a view of a pressure equalization structure, in accordance with some embodiments of the present disclosure.

FIG. 6 shows a view of a pressure equalization structure 600, in accordance with some embodiments of the present disclosure. The pressure equalization structure 600 is similar to the pressure equalization structure 100 in FIG. 1, except that instead of being separate components, the equalization structure 602 and the vehicle component 601 may be integrally formed as a single component that performs the same functions. For example, as shown, the equalization structure 602 and first housing structure 604 may be integrally formed as a single component. However, this is only one example, and the equalization structure 602 may be fully or partially integrated with the first housing structure 604 in any manner. For example, the first housing structure 604 may be comprise multiple components that, when assembled, form both the first housing structure 604 and the equalization structure 602.

Figure 7:
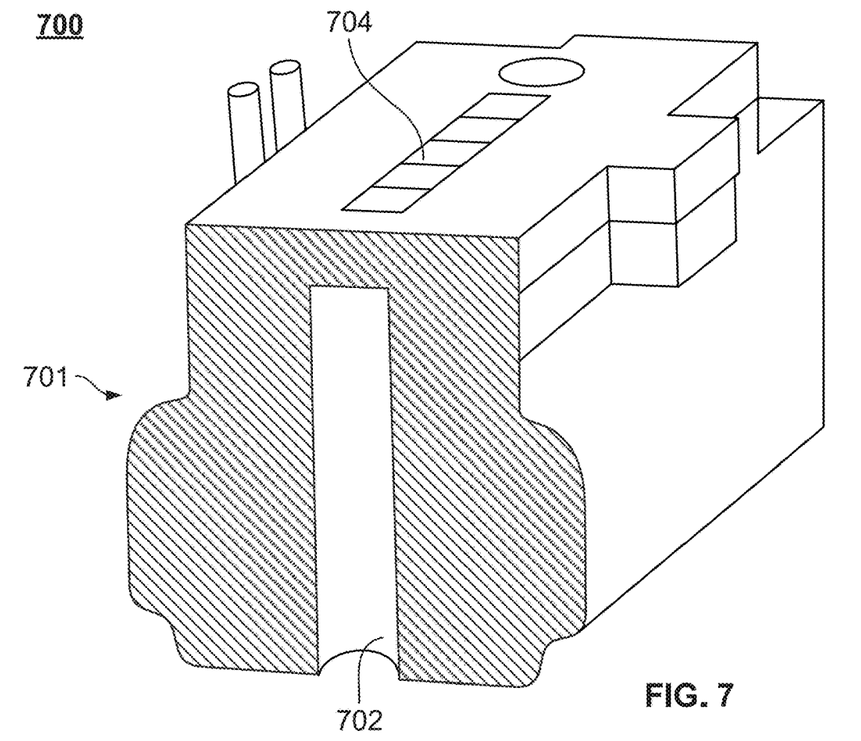
FIG. 7 shows a cross-sectional view of a pressure equalization structure, in accordance with some embodiments of the present disclosure.

FIG. 7 shows a cross-sectional view of a pressure equalization structure 700, in accordance with some embodiments of the present disclosure. The pressure equalization structure 700 is similar to the pressure equalization structure 100 in FIG. 1, except that instead of being separate components, equalization structure 702 and vehicle component 701 may be integrally formed as a single component that performs the same functions. For example, the equalization structure 702 and the first housing structure 704 may be integrally formed as a single component (e.g., in a similar manner as described above with reference to FIG. 6). However, this is only one example, and the equalization structure 702 may be fully or partially integrated with the first housing structure 704 in any manner. For example, the first housing structure 704 may comprise multiple components that, when assembled, form both the first housing structure 704 and the equalization structure 702. For example, as shown, an arrangement of components of the first housing structure 704 may naturally create a passageway that functions as the equalization structure 702.

Figure 8:
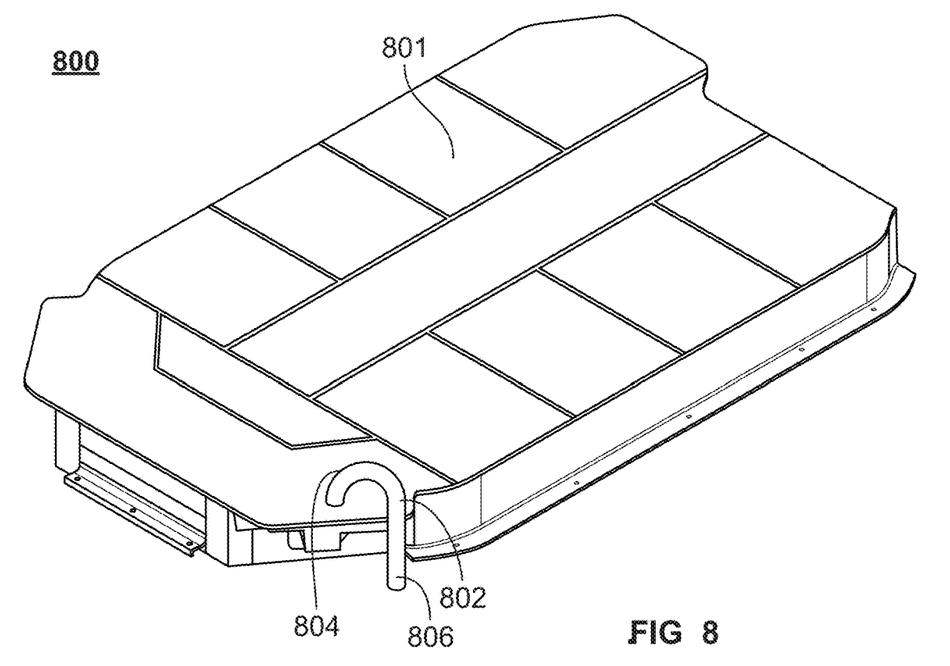
FIG. 8 shows a view of a pressure equalization structure, in accordance with some embodiments of the present disclosure.

FIG. 8 shows a view of a pressure equalization structure 800, in accordance with some embodiments of the present disclosure. The pressure equalization structure 800 is similar to the pressure equalization structure 100 in FIG. 1, except that the vehicle component 801 is a battery module. As shown, the pressure equalization structure 800 includes an equalization structure 802 mounted on an exterior surface of the battery module. The equalization structure 802 may include a first end 804 coupled to a top surface of the battery module and a second end 806 exposed to the outside (ambient pressure). In some embodiments, the equalization structure 802 may be similar to the equalization structure shown in FIG. 5E and may include a vent seal installed inside of the equalization structure 802. The equalization structure 802 may operate in a similar manner as, e.g., the equalization structure 102 described above and will therefore not be described again in detail.

Figure 9:
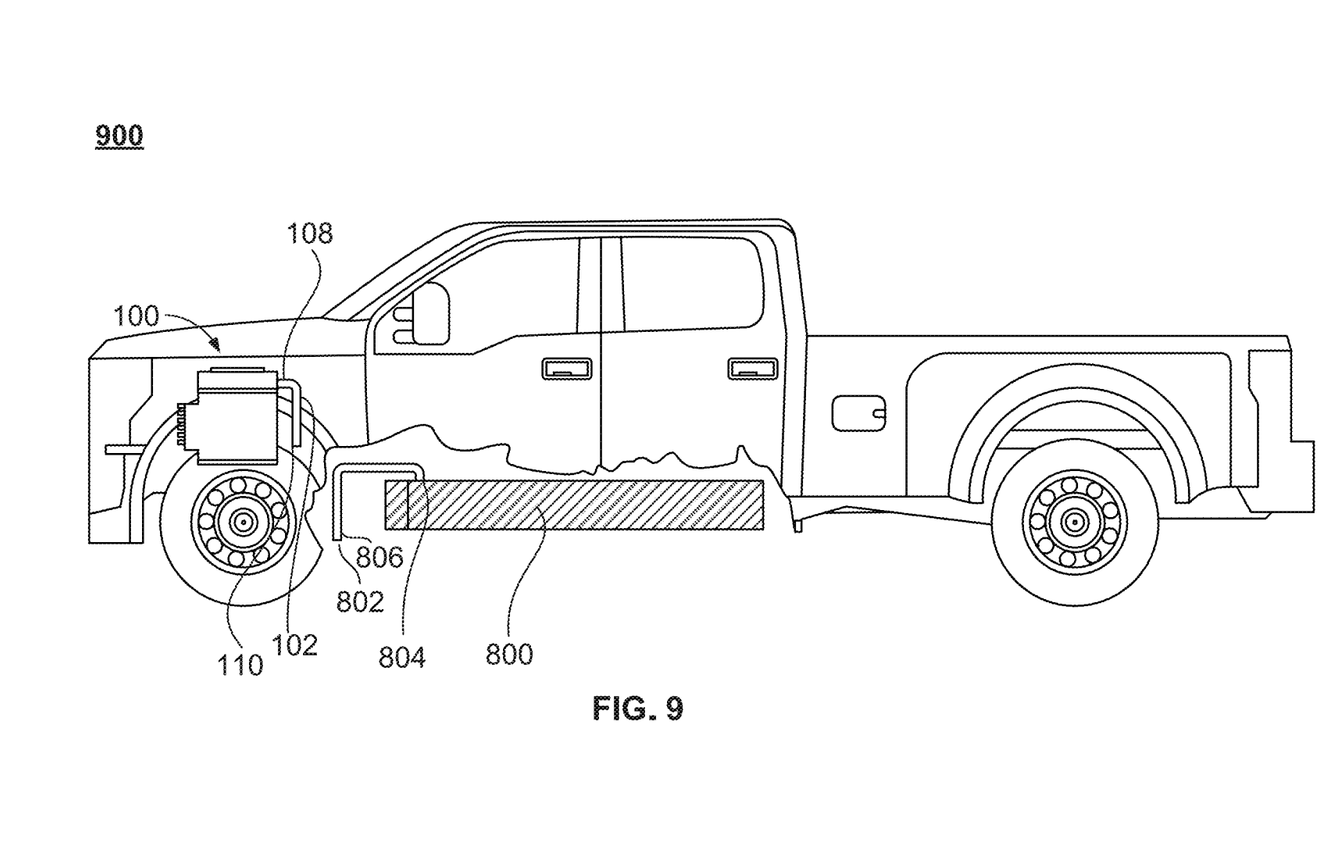
FIG. 9 shows an example of pressure equalization structures installed on a vehicle, in accordance with some embodiments of the present disclosure.

FIG. 9 shows an example of pressure equalization structures installed on a vehicle 900, in accordance with some embodiments of the present disclosure. As shown, the vehicle 900 may include the pressure equalization structure 100 of FIG. 1 and the pressure equalization structure 800 of FIG. 8. As shown, the pressure equalization structures 100 and 800 may be installed such that the equalization structure 102 has an installed orientation in which the first end 108 is arranged above the second end 110, and the equalization structure 802 has an installed orientation in which the first end 804 is arranged above the second end 806. In some embodiments of the present disclosure, the first end 108 may be arranged vertically above or substantially vertically above the second end 110, and the first end 804 may be arranged vertically above or substantially vertically above the second end 806. However, this is only an example, and the equalization structures 102 and 802 may have any installed orientation in which the first end 108 is above the second end 110 (i.e., higher with respect to gravity), and the first end 804 is above the second end 806 (i.e., higher with respect to gravity).

Figure 10:
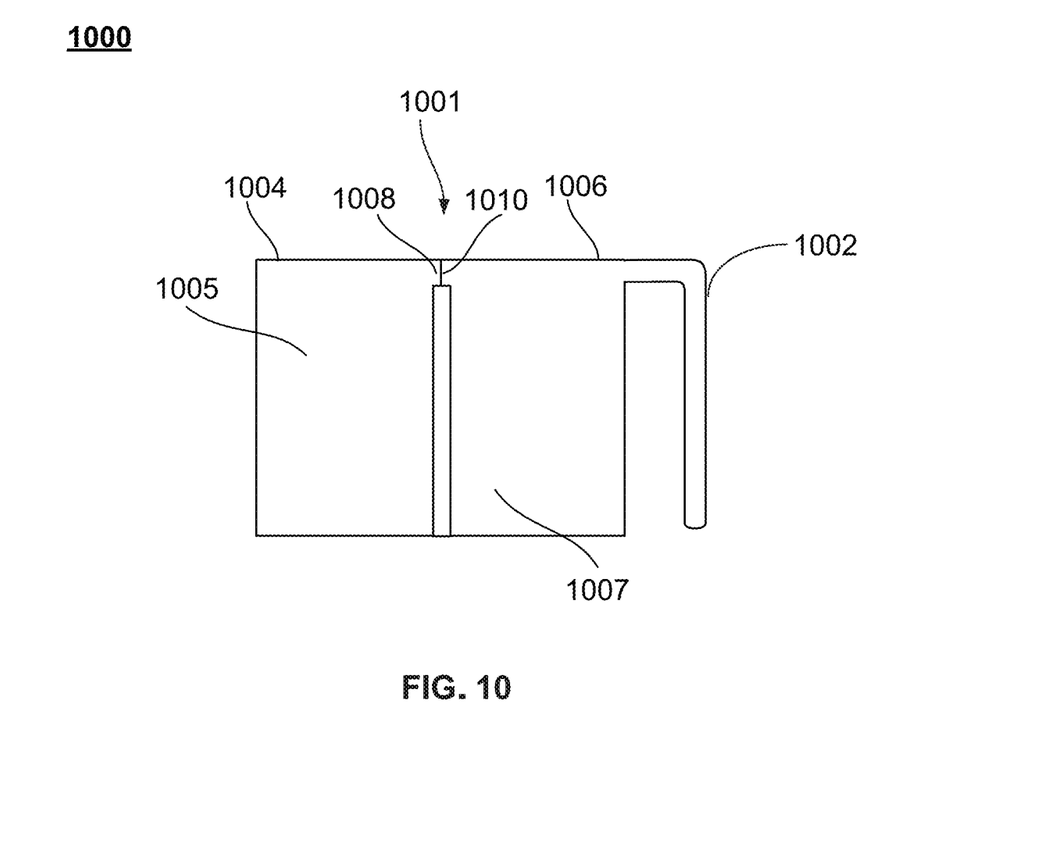
FIG. 10 shows a simplified cross-sectional view of a pressure equalization structure, in accordance with some embodiments of the present disclosure.

FIG. 10 shows a simplified cross-sectional view of a pressure equalization structure 1000, in accordance with some embodiments of the present disclosure. As shown, the pressure equalization structure 1000 may include a vehicle component 1001 and a pressure equalization structure 1002. As shown, the vehicle component 1001 may include a first housing structure 1004 having a first internal cavity 1005 and a second housing structure 1006 having a second internal cavity 1007. In some embodiments, one or more electric motors, bus bars, and inverters may be installed in the first internal cavity 1005. In some embodiments, one or more gearboxes may be installed in the second internal cavity 1007. As shown, the first internal cavity 1005 may be internally vented to the second internal cavity 1007 by passageway 1008 so as to equalize pressure within the first and second internal cavities 1005 and 1007. In some embodiments, a vent seal 1010 may be installed in the passageway 1008. The vent seal 1010 may be a membrane that allows air to pass through, but that is resistant to liquids (e.g., oil, water, etc.) below a certain pressure (e.g., 7 pounds per square inch (PSI)). Thus, the vent seal 1010 may prevent any liquids from passing between the first and second internal cavities 1005 and 1007.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed systems and apparatuses, but is intended to include variations to and modifications thereof, which are within the spirit of the following claims.

What is claimed is:

1. A pressure equalization structure, comprising:
    a vehicle component comprising an internal cavity having a first volume, and a first passageway coupled to the internal cavity; and
    an equalization structure for equalizing air pressure in the internal cavity with ambient pressure, the equalization structure comprising a first end coupled to the first passageway, a second end exposed to the ambient pressure, and a second passageway between the first end and the second end, the second passageway having a second volume,
    wherein the equalization structure has an installed orientation in which the first end is arranged above the second end, such that liquid can enter the second end to compensate for a change in pressure.

2. The pressure equalization structure of claim 1, wherein the second volume is greater than an expected volume of air required to equalize the air pressure in the internal cavity with the ambient pressure when a temperature of the air in the internal cavity is cooled from a first temperature corresponding to a maximum expected operating temperature of the vehicle component to a second temperature corresponding to a minimum expected operating temperature of the vehicle component as a result of the vehicle component being at least partially submerged in water at the second temperature.

3. The pressure equalization structure of claim 1, wherein a ratio of the second volume to the first volume is at least 0.39.

4. The pressure equalization structure of claim 1, wherein the vehicle component is a combined motor, bus bar, and inverter assembly.

5. The pressure equalization structure of claim 1, wherein the vehicle component is a gearbox.

6. The pressure equalization structure of claim 1, wherein the vehicle component is a battery module.

7. The pressure equalization structure of claim 1, further comprising an input seal comprising a semipermeable membrane,
    wherein the input seal is disposed in the first passageway of the vehicle component and separates the internal cavity from the second passageway.

8. The pressure equalization structure of claim 1, further comprising an input seal comprising a semipermeable membrane,
    wherein the input seal is disposed in the second passageway at the first end of the equalization structure and separates the internal cavity from a portion of the second passageway from the input seal to the second end.

9. The pressure equalization structure of claim 1, wherein:
    the equalization structure comprises a cylindrically shaped middle section between a first end section comprising the first end and a cylindrically shaped second end section comprising the second end, and
    the equalization structure is connected to an exterior surface of the vehicle component.

10. The pressure equalization structure of claim 9, wherein a diameter of the cylindrically shaped middle section is larger than a diameter of the cylindrically shaped second end section.

11. The pressure equalization structure of claim 1, wherein the equalization structure comprises a rectangular cross-section.

12. The pressure equalization structure of claim 1, wherein the equalization structure comprises a circular cross-section.

13. The pressure equalization structure of claim 1, wherein the equalization structure is attached to an outer surface of the vehicle component.

14. The pressure equalization structure of claim 1, wherein:
   the internal cavity comprises a first internal cavity housing a first component and a second internal cavity housing a second component, and
   the first internal cavity and the second internal cavity are coupled to each other by a third passageway.

15. The pressure equalization structure of claim 14, wherein the first component is a motor and the second component is a gearbox.

16. The pressure equalization structure of claim 14, further comprising an input seal comprising a semipermeable membrane,
   wherein the input seal is disposed in the third passageway and separates the first internal cavity from the second internal cavity.

17. The pressure equalization structure of claim 1, wherein the equalization structure and the vehicle component are separate components mechanically coupled together.

18. The pressure equalization structure of claim 1, wherein the equalization structure and the vehicle component are integrally formed as a single component.

19. A pressure equalization structure, comprising:
   a vehicle component comprising:
      a first internal cavity having a first volume;
      a first passageway coupled to the first internal cavity;
      a second internal cavity having a second volume; and
      a second passageway coupled to the second internal cavity,
      wherein the first internal cavity is separate from the second internal cavity;
   a first equalization structure for equalizing air pressure in the first internal cavity with ambient pressure, the first equalization structure comprising:
      a first end coupled to the first passageway, a second end exposed to the ambient pressure; and
      a third passageway between the first end and the second end, the third passageway having a third volume,
      wherein the first equalization structure has an installed orientation in which the first end is arranged above the second end, such that liquid can enter the second end to compensate for a change in pressure; and
   a second equalization structure for equalizing air pressure in the second internal cavity with the ambient pressure, the second equalization structure comprising:
      a third end coupled to the second passageway, a fourth end exposed to the ambient pressure; and
      a fourth passageway between the third end and the fourth end, the fourth passageway having a fourth volume,
      wherein the second equalization structure has an installed orientation in which the third end is arranged above the fourth end.

20. The pressure equalization structure of claim 19, wherein:
   the vehicle component is a combined motor, bus bar, inverter, and gearbox assembly;
   the first internal cavity houses the motor, the bus bar, and the inverter; and
   the second internal cavity houses the gearbox.

* * * * *